March 7, 1933.  C. MARCHETTI  1,900,353
TOY
Filed Nov. 10, 1932  2 Sheets-Sheet 1

INVENTOR
Christoph Marchetti
BY
Wm O Bell
ATTORNEY

March 7, 1933.   C. MARCHETTI   1,900,353
TOY
Filed Nov. 10, 1932   2 Sheets-Sheet 2
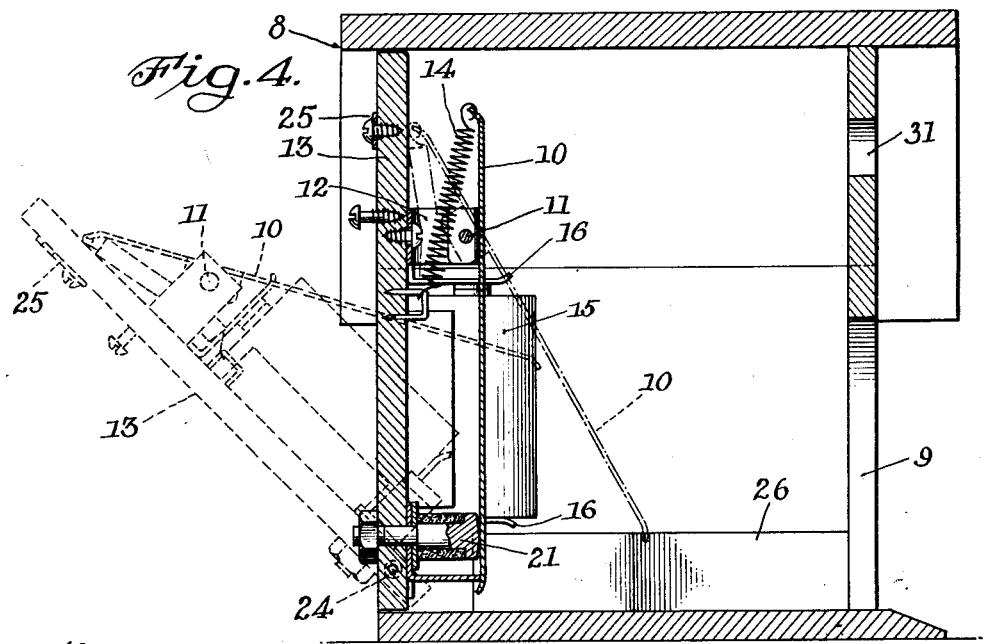
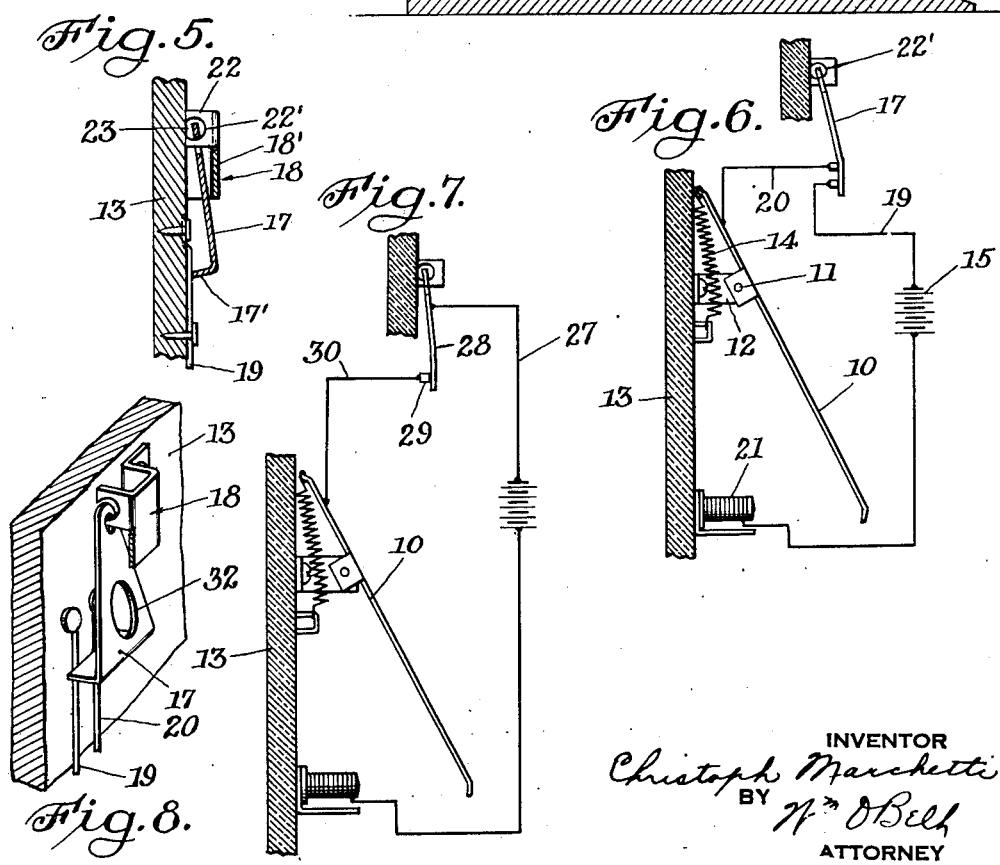
INVENTOR
Christoph Marchetti
BY Wm O Bell
ATTORNEY Patented Mar. 7, 1933

1,900,353

UNITED STATES PATENT OFFICE

CHRISTOPH MARCHETTI, OF CHICAGO, ILLINOIS

TOY

Application filed November 10, 1932. Serial No. 641,976.

This invention relates to toys and it has for its object to provide a device which will furnish amusement to children and adults and which can be easily operated.

Another object of the invention is to provide a toy in the form of a dog house having an ejector therein adapted to be set by insertion of an imitation dog in the house and including an electric circuit and a vibration responsive switch therein which may be operated by a sound or jar to effect ejection of the dog from the house.

And a further object of the invention is to mount the operating mechanism upon a wall of the dog house and arrange the wall to be readily opened to permit replacement of the dry battery without disturbing the mechanism and also to permit other replacements or repairs when required.

In the accompanying drawings, I have illustrated a selected embodiment of the invention and referring thereto, Fig. 1 is a perspective view of the dog house partly broken away and in section to show the operating mechanism.

Fig. 4 is a longitudinal sectional view of the dog house showing the rear wall swung outwardly in broken lines.

Fig. 5 is a detail sectional view showing the switch.

Fig. 6 illustrates the wiring diagram of Figs. 1-5.

Fig. 7 illustrates another equivalent wiring diagram.

Fig. 8 is a detail sectional view of a modified form of switch.

Figure 1:
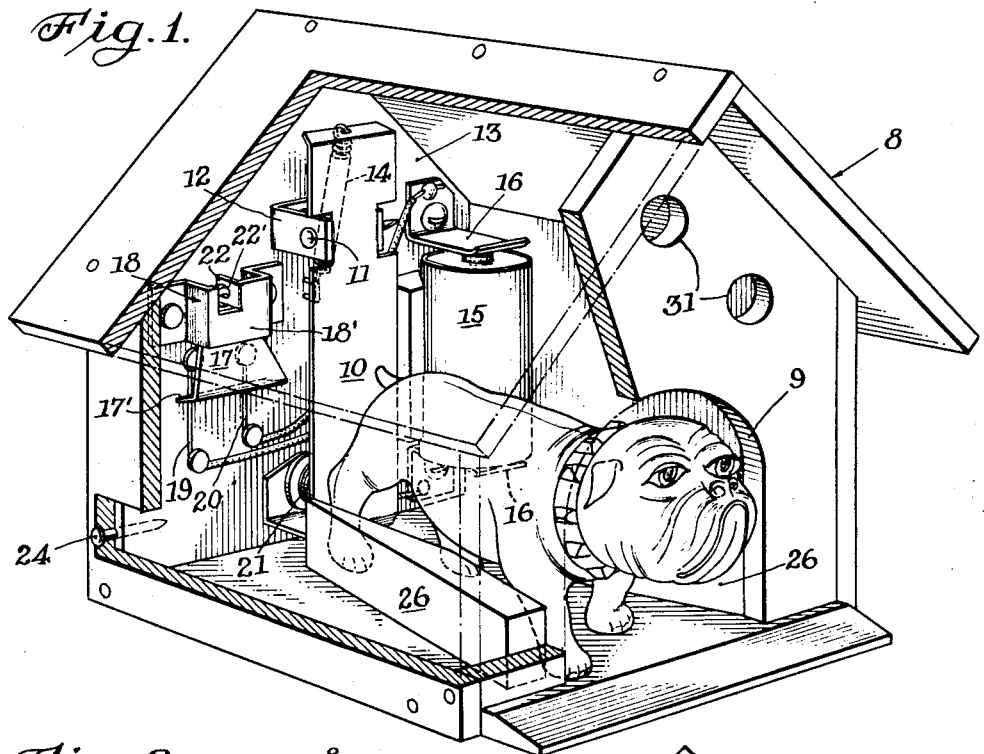
Figure 2:
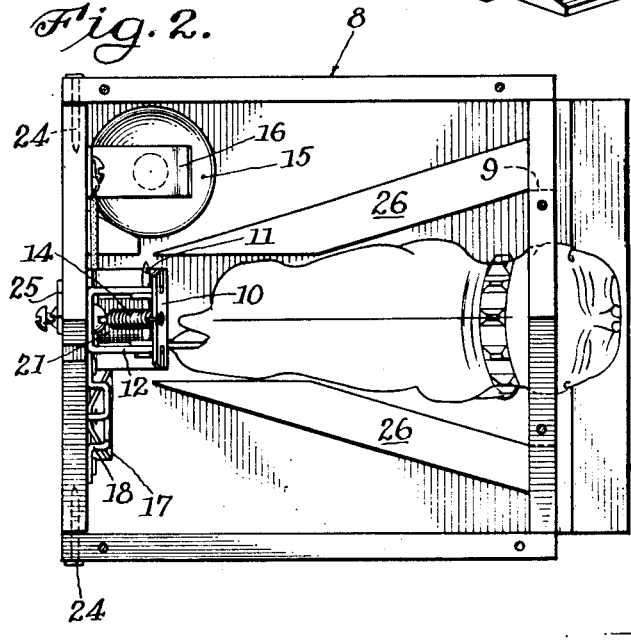
Fig. 2 is a plan view of the dog house with the roof removed.
Figure 3:
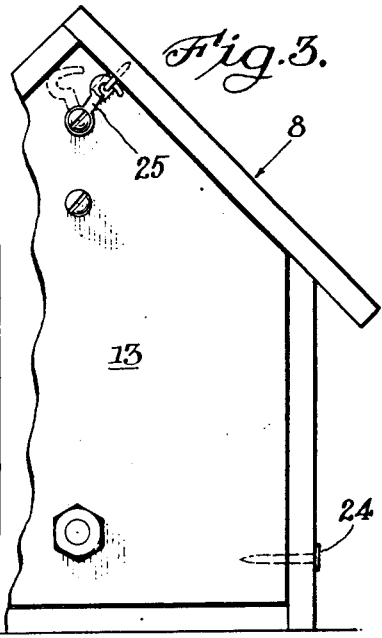
Fig. 3 is a fragmentary rear end elevation of the dog house.

Referring to the drawings, the house 8 is made in the form of an ordinary dog kennel with a large door opening 9 in the front. This house is small in size to correspond with the door which is made preferably of some light material, such as celluloid, and hollow so that it will not require much power to eject it from the house.

An ejector 10, preferably consisting of a metal strip, is pivoted at 11 on a bracket 12 which is fastened to the rear end 13 of the house. A spring 14 is attached at one end to the upper end of the ejector and at its other end to the rear end of the house. A dry battery cell 15 is mounted in spring clips 16 fastened to the rear end of the house so that it can be easily removed and replaced.

A vibration responsive switch 17 is pivotally suspended from a bracket 18 fastened to the rear end of the house and this switch is arranged to engage the two conductor wires 19 and 20 of the electric circuit which includes the battery and a magnet 21 fastened to the rear end of the house back of the lower end of the ejector. The switch is made preferably of sheet metal tapered upwardly and with an inturned flange 17' at its lower edge to engage the two conductor wires by gravity and close the electric circuit. The bracket 18 is bent to form a forwardly extending housing 18' to receive the tapered upper portion of the switch and this housing has a rearwardly extending lip 22 provided with an opening 22' which receives a hook 23 on the upper end of the switch whereby the switch is suspended loosely to hang by gravity in contact with the wires 19, 20.

All of the operating parts are mounted on the rear end 13 of the house which is pivoted at 24 at its lower end so that it may be swung outward to open position as indicated in broken lines in Fig. 4 to permit replacement of the battery or for other purposes. The rear wall is fastened in closed position by a hook 25. Inclined guides 26 are fastened to the floor of the house to guide the dog so that when inserted through the door 9 it will squarely engage the ejector 10 and push it in contact with the magnet 21, and also to guide the dog while being ejected by the ejector.

In Fig. 7 I have shown one wire 27 of the circuit connected directly with the switch 28 which is adapted to close the circuit by engaging the contact 29 to which the other wire 30 of the circuit is attached. In other respects the circuit is similar to that shown in Fig. 6 and the operation of the device is the same with each circuit.

The house will ordinarily be made of wood but the rear wall 13 must be made of insulating material if the parts are mounted thereon as shown and described, otherwise they should be insulated from the rear wall in any manner well known in the art.

When the ejector is unset, the switch will be closed but the ejector, which constitutes the armature for the magnet 21 will be held away from the magnet by the spring 14 and the circuit will be opened. To set the ejector, the toy dog is pushed in through the door backwards against the ejector and the latter is thrown into contact with the magnet whereby the circuit is closed and the ejector is held set in this position. The switch is caused to vibrate to open the circuit and release the ejector from the magnet whereupon the spring causes the ejector to swing on its pivot and eject the dog through the door opening from the house. This ejection is accomplished suddenly and with sufficient force to throw the dog some distance from the house. The switch is intended to be operated by sound to furnish fun and amusement. If the operator comes close to the house and calls loudly to the dog, the sound waves will cause the switch to vibrate enough to open the circuit for an instant and cause the magnet to release the ejector armature and enable the spring to operate the ejector, throwing the dog through the door opening some distance from the house to the surprise of the operator. To facilitate movement of the sound waves into the house, it may be provided in its front with openings 31 in addition to the door opening 9. The same result may be obtained by clapping the hands smartly in front of the house and, of course, the switch can be caused to vibrate by a slight jar or knock on the house.

Spring 14 is fastened at one end to the upper end of the ejector 10 and at its other end to a brad in the rear wall of the house located below the pivot for the ejector.

This construction provides for weak spring action when the ejector is in circuit closing position against and in engagement with the electromagnet, and when the ejector is released the relation between the spring and the ejector becomes more nearly a right angle thereby gradually increasing the force exerted on the ejector by the spring causing a progressively increased snap action as the ejector moves away from the electromagnet. The spring exerts its minimum force against the ejector when the ejector is in circuit closing position at which time the spring is closest to the pivot 11, consequently a minimum of current is required to hold the ejector against the electromagnet.

I have shown and described the operative parts all mounted on the rear wall of the house and as this wall is pivotally arranged it is possible by throwing it to open position to have easy access to all of these parts, but it is not necessary that the switch should be located on the rear wall for it can be located just as well on either side wall and when it is located on a side wall it is to some extent more sensitive to the sound waves than on the back wall. The sensitiveness of the switch when located on the rear wall may be increased by providing an opening 32 in the rear wall, as shown in Fig. 8, which will permit the sound waves to pass therethrough and strike the rear wall of the house and rebound against the underside of the switch and break the electrical contact.

I have shown the invention in a form adapted for commercial purposes but I reserve the right to make any changes in the form, construction and arrangement of parts that may be necessary or desirable in other adaptations of the invention and within the scope of the following claims.

I claim:

1. A toy comprising a dog house having a door opening in its front and a movable rear wall, a spring-operated ejector and a magnet mounted on said rear wall, a vibration sensitive switch, an electric circuit including said ejector, battery, magnet and switch, said ejector adapted to be set for operation in said circuit when a toy dog is pushed through the door opening into the house and against said ejector, said switch adapted to be operated by sound close to the door opening to open the circuit and release the ejector, and said rear wall adapted to be moved to permit replacement of the battery, and guides for guiding the dog when it is pushed into the house to set the ejector and when it is ejected from the house.

2. A toy comprising a dog house having a door opening in the front thereof, and a movable rear wall, an ejector and a magnet mounted on said rear wall, a vibration sensitive switch, an electric circuit including said ejector, magnet, switch, and a battery, said ejector adapted to render said circuit operative when a toy dog is pushed through the door opening into the house and against said ejector, said switch adapted to be operated by sound close to the door opening to open the circuit and release the ejector, and said rear wall adapted to be moved to permit replacement of the battery, guides for guiding the dog when it is pushed into the house to set the ejector and when it is ejected from the house, and a spring operatively connected to said rear wall and said ejector to exert a progressively increasing force as said ejector moves from circuit operative position and adapted to exert a minimum of force when said ejector is in circuit closing position.

3. A toy comprising a dog house having a door opening in the front thereof and a rear wall pivotally mounted to facilitate access to the interior and to the parts of the toy, an electric circuit including an electromagnet and a double contact vibration sensitive switch comprising a swinging member pivotally mounted on said rear wall and in said circuit to open the circuit at at least one of said contacts and adapted to close the circuit at both of said contacts, said swinging member being pivotally mounted on said rear wall and in said circuit and having an opening therein adapted to open the circuit by sound close to the door opening and passing into the house, around the switch, and through the opening in said swinging member, striking the rear wall and rebounding against the underside of the swinging member to open the circuit, an ejector pivotally mounted on said rear wall and in said circuit and having a spring for operation thereof to eject a toy dog through said door opening out of the house and adapted to render said circuit operative when a toy dog is pushed through the door opening into the house and against said ejector, the front of said house having openings in addition to said door opening to facilitate entrance of sound waves therein, and guides on the floor of the house for guiding the dog when it is pushed into the house to set the ejector and when it is ejected from the house.

CHRISTOPH MARCHETTI.